(12) United States Patent
Donatelli et al.

(10) Patent No.: US 9,628,749 B2
(45) Date of Patent: Apr. 18, 2017

(54) PRE-SETTING THE FOREGROUND VIEW OF A PHOTOGRAPH VIA A CAMERA

(75) Inventors: Alessandro Donatelli, Rome (IT); Giuseppe Longobardi, Castellammare di Stabia (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/331,068

(22) Filed: Dec. 20, 2011

(65) Prior Publication Data
US 2013/0155280 A1 Jun. 20, 2013

(51) Int. Cl.
*H04N 5/77* (2006.01)
*H04N 5/232* (2006.01)
*H04N 5/907* (2006.01)

(52) U.S. Cl.
CPC ......... *H04N 5/772* (2013.01); *H04N 5/23222* (2013.01); *H04N 5/23293* (2013.01); *H04N 5/907* (2013.01)

(58) Field of Classification Search
USPC .............................. 348/36, 231.99
See application file for complete search history.

(56) References Cited

U.S. PATENT DOCUMENTS

| 6,930,703 | B1* | 8/2005 | Hubel et al. ............... 348/37 |
| 7,715,598 | B2 | 5/2010 | Li et al. |
| 7,933,508 | B2 | 4/2011 | Konicek |
| 8,508,622 | B1* | 8/2013 | Anon ............... H04N 5/2621 348/222.1 |
| 2003/0076429 | A1* | 4/2003 | Karasaki et al. .......... 348/240.2 |
| 2004/0189849 | A1 | 9/2004 | Hofer |
| 2005/0007468 | A1* | 1/2005 | Stavely et al. ............ 348/239 |
| 2006/0181619 | A1* | 8/2006 | Liow et al. ............... 348/239 |
| 2008/0030599 | A1* | 2/2008 | Stavely et al. ............ 348/239 |
| 2008/0129842 | A1 | 6/2008 | Shibutani |
| 2008/0192125 | A1* | 8/2008 | Kang et al. ............ 348/222.1 |
| 2009/0015702 | A1* | 1/2009 | Garcia Alonso .......... 348/333.02 |
| 2009/0153685 | A1* | 6/2009 | Son ................... H04N 5/232 348/208.99 |
| 2009/0175609 | A1 | 7/2009 | Tan |

(Continued)

FOREIGN PATENT DOCUMENTS

| KR | 1019990016552 A | 3/1999 |
| KR | 1020070027175 A | 5/2008 |

OTHER PUBLICATIONS http://www.pma-show.com/0297/sony/digitalcameras/digitalcamera, "Sony Cyber-shot DSC-T200", Dec. 20, 2011 (pp. 1-4).

(Continued)

*Primary Examiner* — Roberto Velez
*Assistant Examiner* — Quan Pham
(74) *Attorney, Agent, or Firm* — Brian J. Colandreo, Esq.; Jeffrey T. Placker, Esq.; Holland & Knight LLP (57) ABSTRACT

A method, computer program product, and computer system for pre-setting the foreground view of a photograph. A reference image is captured by a camera. The reference image is compared to a current a current image displayed within a viewing field of the camera. One or more alignment guides are displayed within the viewing field of the camera to aid in aligning the reference image and the current image. If it is determined that the reference image and the current image are aligned, the capture of a preferred photograph is enabled.

21 Claims, 4 Drawing Sheets

(56) References Cited

U.S. PATENT DOCUMENTS

| | | |
|---|---|---|
| 2009/0284582 A1* | 11/2009 | Mei et al. .................. 348/36 |
| 2010/0039527 A1 | 2/2010 | Kretz et al. |
| 2010/0066810 A1* | 3/2010 | Ryu et al. .................. 348/36 |
| 2010/0157128 A1* | 6/2010 | Choi et al. ............ 348/333.03 |
| 2010/0254609 A1 | 10/2010 | Chen et al. |
| 2010/0312547 A1* | 12/2010 | Van Os et al. ................ 704/9 |
| 2011/0012989 A1* | 1/2011 | Tseng ................ G03B 17/20 |
| | | 348/36 |
| 2011/0090357 A1 | 4/2011 | Rainier et al. |
| 2011/0205379 A1 | 8/2011 | Konicek |
| 2013/0050507 A1* | 2/2013 | Syed et al. ............. 348/207.1 |

OTHER PUBLICATIONS

International Search Report Issued in PCT/US2012/067816, dated Mar. 19, 2013.

International Preliminary Report on Patentability in corresponding International Application No. PCT/US2012/067816, dated Jun. 24, 2014, 7 pages.

\* cited by examiner

PRE-SETTING THE FOREGROUND VIEW OF A PHOTOGRAPH VIA A CAMERA

TECHNICAL FIELD

This disclosure relates to photography and camera technology, and more particularly, to pre-setting the foreground view of a photograph.

BACKGROUND

Photography and camera technology continues to advance, providing sophisticated tools to enable capture of better images. Such tools include autofocus, image stabilization, red-eye reduction, self-timers, shutter speed, and depth of focus control. However, photography is more than merely taking a good picture. People have varied tastes and preferences in the composition of objects and people that create a photograph. Photography is a combination of science and art. Because photography is more than just a collection of good images, merely providing tools to enhance the capture of better images ignores the artistic aspect of photography and thus is insufficient.

There may be cases that a user would like to take a photograph that includes themselves, but also to ensure that the composition of the photograph is the way that they like it. Although self-timers of cameras may help in such a situation, an appropriate flat surface at the correct height may not be readily available. Additionally, although a tripod would be useful, it is not always convenient to carry around such equipment. Further, when asking someone else to take the photograph, a person can never be sure that the photograph has the composition and focus desired.

BRIEF SUMMARY

In one implementation, a method for pre-setting the foreground view of a photograph, performed by one or more computing devices, includes a camera capturing a reference image. The reference image is compared to a current image displayed within a viewing field of the camera. One or more alignment guides are displayed within the viewing field of the camera to aid in aligning the reference image and the current image. If it is determined that the reference image and the current image are aligned, the capture of a preferred photograph is enabled.

One or more of the following features may be included. Enabling the capture of the preferred photograph may include enabling a shutter of the camera responsive to determining that the reference image and the current image are aligned. The method may include storing the reference image in a temporary cache memory system. The method may include capturing the preferred photograph. The capturing of the preferred photograph may include discarding the reference image. Discarding the reference image may be responsive to receiving input from a user. The one or more alignment guides displayed in the viewing field may include one or more guidelines, arrows, or audible directions. If it is determined that the reference image and the current image are aligned, an indication of image alignment may be generated. The indication may be one or more of an audible indication, a visual indication, and a sensory indication.

In another implementation, a computer program product resides on a computer readable medium that has a plurality of instructions stored on it. When executed by a processor, the instructions cause the processor to perform operations including a camera capturing a reference image. The reference image is compared to a current image displayed within a viewing field of the camera. One or more alignment guides are displayed within the viewing field of the camera to aid in aligning the reference image and the current image. If it is determined that the reference image and the current image are aligned, the capture of a preferred photograph is enabled.

One or more of the following features may be included. Enabling the capture of the preferred photograph may include enabling a shutter of the camera responsive to determining that the reference image and the current image are aligned. The reference image may be stored in a temporary cache memory system. The preferred photograph may be captured. The capturing of the preferred photograph may include discarding the reference image. Discarding the reference image may be responsive to receiving input from a user. The one or more alignment guides displayed in the viewing field may include one or more of guidelines, arrows, and audible directions. If it is determined that the reference image and the current image are aligned, an indication of image alignment may be generated. The indication may be one or more of an audible indication, a visual indication, and a sensory indication.

In another implementation, a computing system includes a processor and memory configured to perform operations including capturing a reference image. The reference image is compared to a current image displayed within a viewing field of the camera. One or more alignment guides are displayed within the viewing field of the camera to aid in aligning the reference image and the current image. If it is determined that the reference image and the current image are aligned, the capture of a preferred photograph is enabled.

One or more of the following features may be included. Enabling the capture of the preferred photograph may include enabling a shutter of the camera responsive to determining that the reference image and the current image are aligned. The reference image may be stored in a temporary cache memory system. The preferred photograph may be captured. The capturing of the preferred photograph may include discarding the reference image. Discarding the reference image may be responsive to receiving input from a user. The one or more alignment guides displayed in the viewing field may include one or more of guidelines, arrows, and audible directions. If it is determined that the reference image and the current image are aligned, an indication of image alignment may be generated. The indication may be one or more of an audible indication, a visual indication, and a sensory indication.

The details of one or more implementations are set forth in the accompanying drawings and the description below. Other features and advantages will become apparent from the description, the drawings, and the claims.

DETAILED DESCRIPTION

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
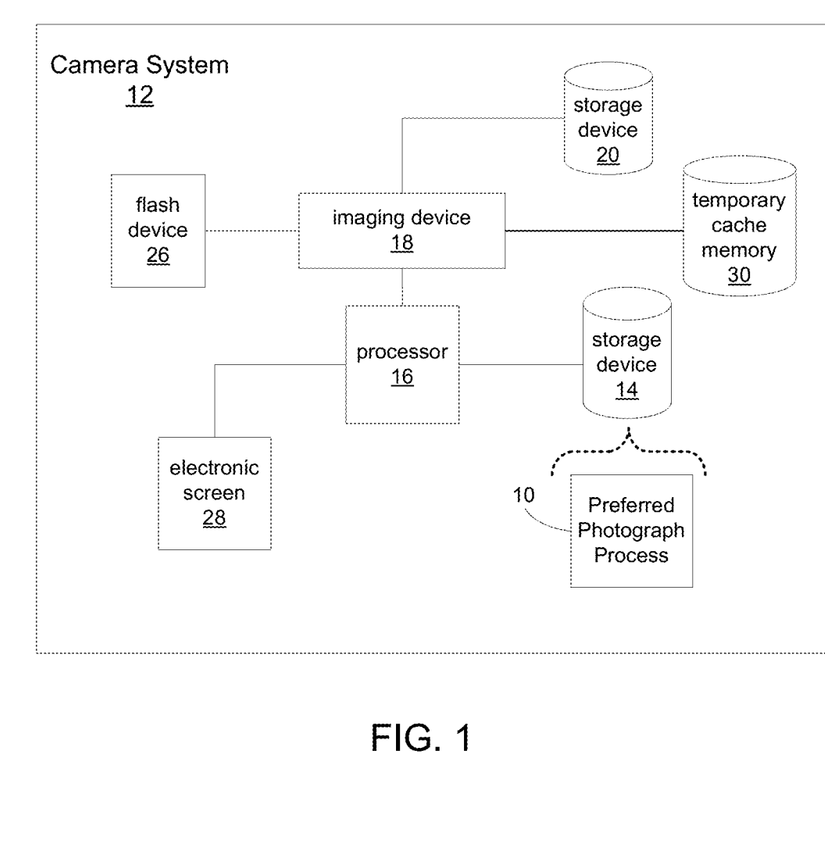
FIG. 1 is a diagrammatic view of a preferred photograph process executed on an image capture device.

Referring to FIG. 1, there is shown a preferred photograph process 10 that may reside on and may be executed by an image capturing device (e.g., camera system 12). Camera system 12 may include, for example, a chemical film based camera, a digital camera, a video camera, a web camera, and a camera phone. The instruction sets and subroutines of preferred photograph process 10, which may be stored on storage device 14 coupled to camera system 12, may be executed by one or more processors, (e.g., processor 16) and one or more memory architectures (not shown) incorporated into camera system 12. Storage device 14 may include but is not limited to: a hard disk drive; a tape drive; an optical drive; a RAID array; a random access memory (RAM); a read-only memory (ROM); compact flash (CF) storage devices; secure digital (SD) storage devices; and memory stick storage devices.

Camera system 12 may include imaging device 18 configured to take one or more pictures of one or more objects within a viewing field of imaging device 18. As mentioned above, camera system 12 may include, for example, a chemical film based camera, a digital camera, a video camera, a web camera and a camera phone. As such, imaging device 18 may include, but is not limited to, a chemical film based imaging device (e.g., which may be capable of capturing an image on one or more frames of chemical based photographic film, or a photographic plate), and a digital imaging device, such, but not limited to, a charge coupled device (CCD) or a complementary metal-oxide-semiconductor (CMOS) sensor capable of image capture. Imaging device 18, which may include a chemical film based imaging device and/or a digital imaging device may be configured as a video imaging device, e.g., which may be capable of capturing a sequence of still images that may be capable or representing scenes in motion.

Imaging device 18 may include a shutter mechanism (not shown) and may be coupled to one or more of storage devices 14, 20 configured to store pictures taken by camera system 12. Storage device 20 may include, but is not limited to, a chemical film based storage device (e.g., including one or more frames of chemical based photographic film and/or a photographic plate), and an electronic storage device (e.g., a hard disk drive, a tape drive, an optical drive, a RAID array, a random access memory, a read only memory, compact flash (CF) storage devices, secure digital (SD) storage devices, and memory stick storage devices). Camera system 12 may include one or more lenses (not shown), an auto-focusing mechanism (not shown), and a range-finding mechanism (not shown), which may be coupled to imaging device 18. Imaging device 18 may be coupled to processor 16, and may be configured to send one or more signals to imaging device 18 for triggering imaging device 18 to take one or more pictures.

Imaging device 18 may include a flash device 26. Upon determining that a detected light level (e.g., as detected with a photocell; not shown) is below a predefined threshold light level, imaging device 18 may provide flash illumination by triggering flash device 26. When triggered, flash device 26 may provide the necessary illumination to achieve a light level equal to, or above, the predefined threshold light level. Once properly illuminated, imaging device 18 may take one or more pictures of an object illuminated by flash device 26.

Camera system 12 may include electronic screen 28. Electronic screen 28 may be a display screen used as a viewfinder or for displaying the viewing field of the camera. Camera system 12 may generate a live preview of the viewing field of camera system 12 by means of continuously and directly projecting the image formed by the lens of camera system 12 onto a main image sensor that feeds electronic screen 28 with the live preview image of the viewing field of the camera. Electronic screen 28 may be a liquid crystal display (LCD) or an electronic viewfinder.

As discussed above and referring also to FIGS. 2-4, preferred photograph process 10 may capture 100 reference image 152. Reference image 152 may be compared 102 to current image 156 displayed within viewing field 150 of an image capture device (e.g. camera system 12). One or more alignment guides 154 may be displayed 106 within viewing field 150 of camera system 12 to aid in aligning reference image 152 and current image 156. If it is determined 104 that reference image 152 and current image 156 are aligned, the capture of a preferred photograph may be enabled 114.

Figure 2:
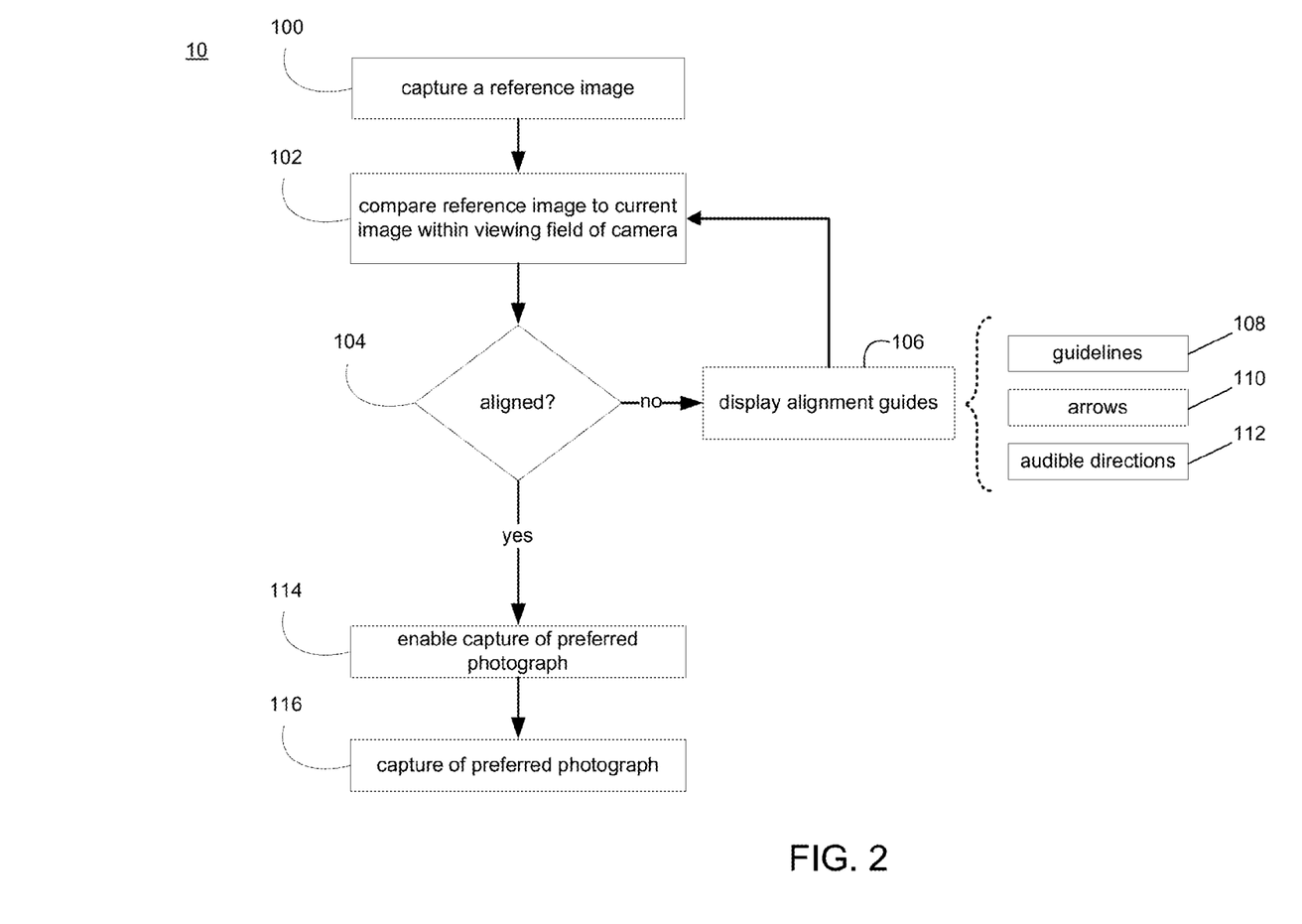
FIG. 2 is a flowchart of the preferred photograph process of FIG. 1.
Figure 3:
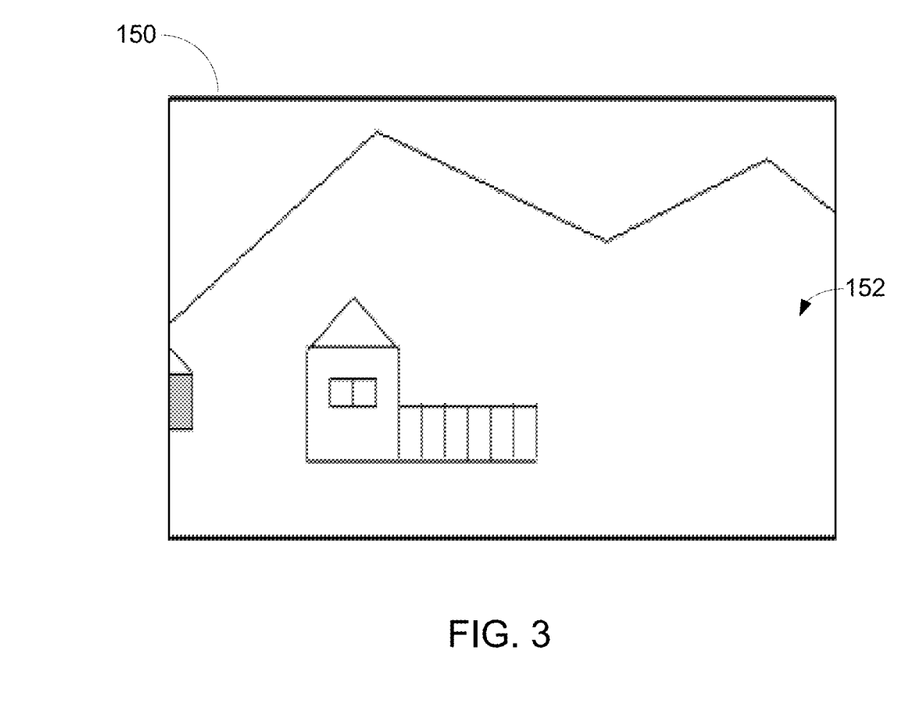
FIG. 3 diagrammatically depicts a viewing field of the image capture device of FIG. 1 displaying a reference image therein.

Now referring to FIG. 2, in more detail, preferred photograph process 10 captures 100 reference image 152. In some embodiments, preferred photograph process 10 may cause camera system 12 to capture reference image 152. A user may adjust various settings on camera system 12 that may include, but are not limited to, zoom, focus, flash, image stabilization, red-eye reduction, face and smile recognition, and depth of focus control. Preferred photograph process 10 may display reference image 152 captured by camera system 12 on electronic screen 28 of the device for review by the user. The user may choose to use the captured reference image 152 or to discard reference image 152 and take another reference image 152.

Preferred photograph process 10 may store captured reference image 152 in a temporary cache memory system 30. In some embodiments, temporary cache memory system 30 may include memory cards having flash memory, internal memory, onboard flash memory, or removable storage. In some embodiments reference image 152 may be stored on a remote memory (wireless or wired) processing equipment. The temporary cache memory system 30 may also be on a remote connected system.

Preferred photograph process 10 may disable the shutter mechanism (not shown) of the image capture device after storing reference image 152 to the temporary cache memory system 30. In some embodiments, disabling the shutter mechanism of the image capture device may ensure that a photograph that is not a preferred photograph is not captured. In some embodiments, features of camera system 12 may be locked, so that they cannot be adjusted prior to taking the preferred photograph.

Preferred photograph process 10 may compare 102 reference image 152 to current image 156 displayed within viewing field 150 of camera system 12. In some embodiments, an algorithm, similar to those used in panoramic stitching of photographs may be used. The algorithm used may identify similar portions of reference image 152 and current image 156 displayed within viewing field 150 to determine if the images are aligned 104 (i.e. reference image 152 and current image 156 overlap completely). In some embodiments, if current image 156 displayed within viewing field 150 and reference image 152 are approximately aligned, preferred photograph process 10 may trigger the autofocus and zoom features of camera system 12 to more accurately align the images.

Figure 4:
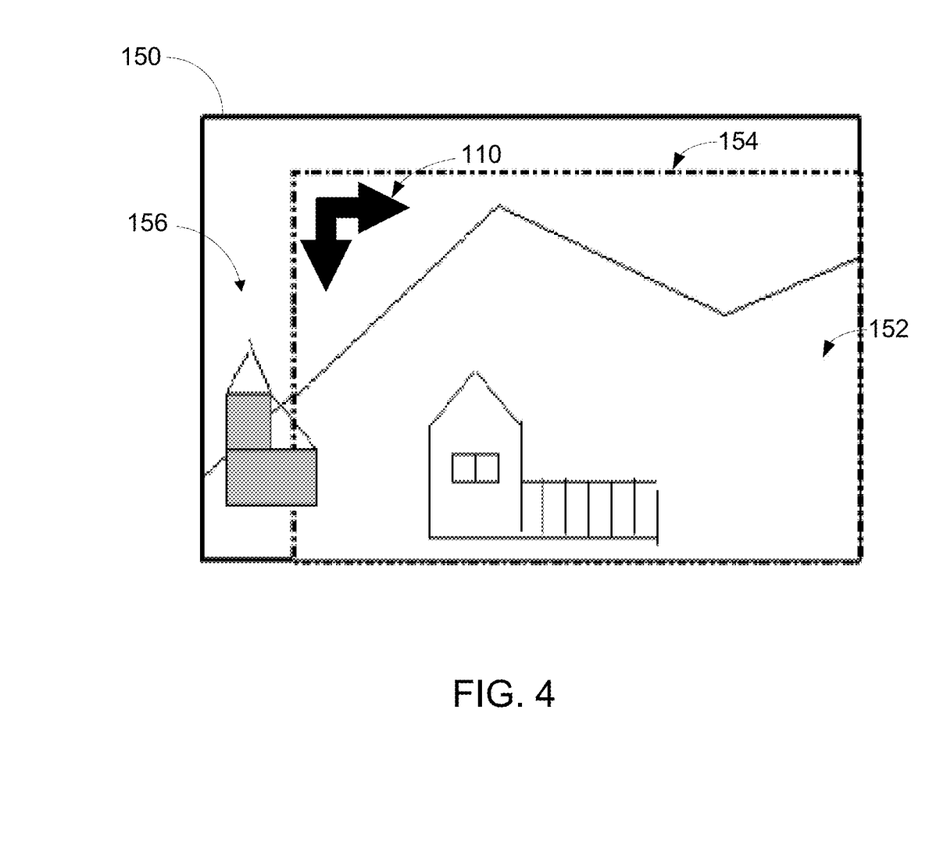
FIG. 4 diagrammatically depicts a viewing field of the image capture device of FIG. 1 displaying alignment guides within the viewing field of the image capture device.

If the images are not aligned properly aligned to overlap, one or more alignment guides 154 may be displayed 106 within viewing field 150 of camera system 12 to aid in aligning reference image 152 and current image 156 displayed within viewing field 150. In some embodiments, alignment guides 154 displayed in viewing field 150 of camera system 12 may be guidelines 154, arrows 110 or audible directions 112.

Alignment guides 154 may be either visual or audio guides to instruct the user how to position camera system 12 to correctly align reference image 152 and current image 156. In the case of guidelines, electronic screen 28 displaying current image 156 may display lines that denote the boundaries of reference image 152. As camera system 12 is moved, the guidelines 108 will adjust accordingly. In some embodiments, the way to align current image 156 and reference image 152 may be to move camera system 12 until guidelines 108 are aligned within viewing field 150 of camera system 12.

In some embodiments, alignment guides 154 are arrows 110. Arrows 110 may be used in conjunction with guidelines 108. In some embodiments, arrows 110 may be used alone or in combination with another alignment guide. Electronic screen 28 displaying current image 156 may also display arrow 110 indicating the direction which camera system 12 should be moved. For example, if current image 156 needs to be moved to the right and down in order to align with reference image 152, arrow 110 may be displayed pointing to the right and down.

In some embodiments, alignment guides 154 may be audible directions 112 to instruct or guide the user to position camera system 12. For example, if camera system 12 determines that the device should be moved to the right, the audible directions may be emitted from a speaker of camera system 12 stating "Please move to your right" or "Please rotate 30 degrees to your right." Once camera system 12 is adjusted, camera system 12 may determine if further positioning is required and provide audible directions accordingly.

Additionally, alignment guides 154 may also include precise instructions that may either be displayed on electronic screen 28 or given as audible directions. For example, preferred photograph process 10, responsive to the comparison 102 of reference image 152 to current image 156, may determine that camera system 12 needs to be moved in a particular direction by an identified distance (i.e. three feet to the left). Preferred photograph process 10 may also determine that camera system 12 needs to be rotated by an identified angle (i.e. 30 degrees to the right). In some embodiments, alignment guide 154 may also determine that camera system 12 should be held vertically to take a portrait orientation photograph or that camera system 12 should be held horizontally to take a landscape orientation photograph.

Any of the above-described alignment guides 154 may be used alone or in combination. The user may configure camera system 12 to use one or more of alignment guides 154 to take a preferred photograph.

If preferred photograph process 10 determines that reference image 152 and current image 156 are aligned, an indication of image alignment may be generated. This indication may be an audible indication, a visual indication, and/or a sensory indication. For example, an audible indication may include, but it not limited to, a sound/audio file being played responsive to the alignment, or a verbal statement being played by camera system 12. In some embodiments, the audible indication may be predetermined at the time of manufacture. In some embodiments, the audible indication may be configured by the user, such as an audio recording uploaded or selected by the user.

The indication may be a visual indication, such as a blinking screen, a color overlay to current image 156 on electronic screen 28, an animation displayed on electronic screen 28 of camera system 12, or other visual indication. The indication may be a sensory indication, such as a vibration of camera system 12.

When preferred photograph process 10 compares 102 reference image 152 to current image 156 displayed within viewing field 150 of camera system 12, and determines 104 that the images are aligned, the capture of a preferred photograph may be enabled. In some embodiments, the enabling the capture of a preferred photograph may include enabling the shutter mechanism of camera system 12 in response to determining that reference image 152 and current image 156 are aligned.

Preferred photograph process 10 may capture 116 the preferred photograph in response to enabling the shutter of camera system 12. If reference image 152 was captured after triggering flash device 26, when capturing the preferred photograph, camera system 12 may capture the preferred photograph after triggering flash device 26.

The preferred photograph may be stored to storage devices 14, 20 configured to store pictures taken by camera system 12. In some embodiments, the preferred photograph may be stored to a removable storage device of camera system 12.

Preferred photograph process 10 may discard reference image 152 responsive to capturing the preferred photograph. Reference image 152 may be erased from the temporary cache memory system 30. In some embodiments, instead of discarding reference image 152 responsive to capturing the preferred photograph, preferred photograph process 10 may discard reference image 152 after receiving input from the user. For example, if the user would like to use the same reference image 152 for multiple people, then it may be useful to retain reference image 152 until all the desired photographs are taken. Discarding reference image 152 responsive to receiving input from a user (such as selecting an option in the menu or selecting the appropriate button) ensures the ability of the user to use reference image 152 in the multiple preferred photographs.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
capturing, by a camera, a reference image via a shutter mechanism;
locking the camera responsive to capturing the reference image, including disabling the shutter mechanism of the camera prior to capture of a preferred photograph;
preventing adjustment of one or more features of the camera prior to capture of the preferred photograph by locking the one or more features;
comparing the reference image to a current image displayed within a viewing field of the camera;

providing one or more alignment guides to move the camera in a particular direction to aid in aligning the reference image and the current image including:
displaying arrows within the viewing field of the camera; and
providing audible instructions, the audible instructions being configured by a user and including one or more of an audio recording uploaded by the user and an audio recording selected by the user;
configuring the camera to provide a vibration when the reference image and the current image are aligned;
when the reference image and the current image are approximately aligned, automatically triggering an autofocus feature and a zoom feature of the camera to more accurately align the reference image and the current image;
if it is determined that the reference image and the current image are aligned, enabling the shutter mechanism of the camera for enabling the capture of the preferred photograph;
capturing a plurality of images prior to discarding the reference image; and
triggering a flash device if it is determined that the reference image was captured after the flash device was triggered;
wherein the reference image and the current image are aligned when the reference image and the current image are completely overlapping, and
wherein the one or more alignment guides displayed in the view field include guidelines, wherein the guidelines denote the boundaries of the reference image.

2. The computer-implemented method of claim 1 further comprising storing the reference image in a temporary cache memory system.

3. The computer-implemented method of claim 1 further comprising capturing the preferred photograph.

4. The computer-implemented method of claim 3 wherein capturing the preferred photograph includes discarding the reference image.

5. The computer-implemented method of claim 3 further comprising discarding the reference image responsive to receiving input from a user.

6. The computer-implemented method of claim 1 further comprising if it is determined that the reference image and the current image are aligned, generating an indication of image alignment, wherein the indication is one or more of an audible indication, a visual indication, and a sensory indication.

7. The computer-implemented method of claim 6 wherein the indication of image alignment includes at least one of a blinking screen and an animation displayed on the camera.

8. A computer program product residing on a non-transitory computer readable medium having a plurality of instructions stored thereon which, when executed by a processor, cause the processor to perform operations comprising:
capturing, by a camera, a reference image via a shutter mechanism;
locking the camera responsive to capturing the reference image, including disabling the shutter mechanism of the camera prior to capture of a preferred photograph;
preventing adjustment of one or more features of the camera prior to capture of the preferred photograph by locking the one or more features;
comparing the reference image to a current image displayed within a viewing field of the camera;
providing one or more alignment guides to move the camera in a particular direction to aid in aligning the reference image and the current image including:
displaying arrows within the viewing field of the camera; and
providing audible instructions, the audible instructions being configured by a user and including one or more of an audio recording uploaded by the user and an audio recording selected by the user;
configuring the camera to provide a vibration when the reference image and the current image are aligned;
if it is determined that the reference image and the current image are aligned, enabling the shutter mechanism of the camera for enabling the capture of the preferred photograph;
capturing a plurality of images prior to discarding the reference image; and
triggering a flash device if it is determined that the reference image was captured after the flash device was triggered;
wherein the reference image and the current image are aligned when the reference image and the current image are completely overlapping, and
wherein the one or more alignment guides displayed in the view field include guidelines, wherein the guidelines denote the boundaries of the reference image.

9. The computer program product of claim 8 further comprising storing the reference image in a temporary cache memory system.

10. The computer program product of claim 8 further comprising capturing the preferred photograph.

11. The computer program product of claim 10 wherein capturing the preferred photograph includes discarding the reference image.

12. The computer program product of claim 10 further comprising discarding the reference image responsive to receiving input from a user.

13. The computer program product of claim 8 further comprising if it is determined that the reference image and the current image are aligned, generating an indication of image alignment, wherein the indication is one or more of an audible indication, a visual indication, and a sensory indication.

14. The computer program product of claim 13 wherein the indication of image alignment includes at least one of a blinking screen and an animation displayed on the camera.

15. A computing system including a processor and memory configured to perform operations comprising:
capturing, by a camera, a reference image via a shutter mechanism;
locking the camera responsive to capturing the reference image, including disabling the shutter mechanism of the camera prior to capture of a preferred photograph;
preventing adjustment of one or more features of the camera prior to capture of the preferred photograph by locking the one or more features;
comparing the reference image to a current image displayed within a viewing field of the camera;
providing one or more alignment guides to move the camera in a particular direction to aid in aligning the reference image and the current image including:
displaying arrows within the viewing field of the camera; and
providing audible instructions , the audible instructions being configured by a user and including one or more of an audio recording uploaded by the user and an audio recording selected by the user;

configuring the camera to provide a vibration when the reference image and the current image are aligned;

when the reference image and the current image are approximately aligned, automatically triggering an autofocus feature and a zoom feature of the camera to more accurately align the reference image and the current image;

if it is determined that the reference image and the current image are aligned, enabling the shutter mechanism of the camera for enabling the capture of the preferred photograph;

capturing a plurality of images prior to discarding the reference image; and triggering a flash device if it is determined that the reference image was captured after the flash device was triggered;

wherein the reference image and the current image are aligned when the reference image and the current image are completely overlapping, and wherein the one or more alignment guides displayed in the view field include guidelines, wherein the guidelines denote the boundaries of the reference image.

16. The computing system of claim 15 further comprising storing the reference image in a temporary cache memory system.

17. The computing system of claim 15 further comprising capturing the preferred photograph.

18. The computing system of claim 17 wherein capturing the preferred photograph includes discarding the reference image.

19. The computing system of claim 17 further comprising discarding the reference image responsive to receiving input from a user.

20. The computing system of claim 15 further comprising if it is determined that the reference image and the current image are aligned, generating an indication of image alignment, wherein the indication is one or more of an audible indication, a visual indication, and a sensory indication.

21. The computing system of claim 20 wherein the indication of image alignment includes at least one of a blinking screen and an animation displayed on the camera.

* * * * *